(12) United States Patent
Villers

(10) Patent No.: US 6,224,817 B1
(45) Date of Patent: May 1, 2001

(54) METHOD AND APPARATUS FOR MAKING CONTAINERS FROM THERMOPLASTIC MATERIALS

(75) Inventor: Pascal Villers, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/142,317

(22) PCT Filed: Mar. 3, 1997

(86) PCT No.: PCT/FR97/00366

§ 371 Date: Sep. 4, 1998

§ 102(e) Date: Sep. 4, 1998

(87) PCT Pub. No.: WO97/32712

PCT Pub. Date: Sep. 12, 1997

(30) Foreign Application Priority Data

Mar. 5, 1996 (FR) .................................................. 96 03329

(51) Int. Cl.$^7$ .............................. B29C 49/06; B29C 49/36
(52) U.S. Cl. .......................... 264/503; 264/521; 264/523; 264/537; 264/905; 264/906; 264/535; 264/530; 425/522; 425/182; 425/195
(58) Field of Search ..................................... 264/523, 530, 264/537, 905, 906, 521, 535, 503; 425/522, 182, 195

(56) References Cited

U.S. PATENT DOCUMENTS

| | | | |
|---|---|---|---|
| 4,315,888 | * | 2/1982 | Hafele .................................. 264/530 |
| 5,520,877 | * | 5/1996 | Collette et al. ...................... 264/530 |
| 5,660,902 | * | 8/1997 | Unterlander et al. ................. 264/523 |

FOREIGN PATENT DOCUMENTS

| | | |
|---|---|---|
| 2450696 | 5/1975 | (DE) . |
| 425360 | 5/1991 | (EP) . |
| 2508004 | 12/1982 | (FR) . |
| 9518005 | 7/1995 | (WO) . |

* cited by examiner

Primary Examiner—Jan H. Silbaugh
Assistant Examiner—Suzanne E McDowell
(74) Attorney, Agent, or Firm—Suhgrue, Mion, Zinn, Macpaek & Seas, PLLC

(57) ABSTRACT

A container (5) such as a bottle made of thermoplastic material and provided with a bottom wall having an inwardly convex curved central portion (3) is disclosed. The container is produced by blow moulding a blank (4) with at least one incipient bottom recess (3) in a finishing mould (15a, 15b, 11) of which the bottom wall (11) has an arched central portion (10) substantially matching the recess in the bottom of the container to be produced. Said container is produced by causing relative rotation of the central portion (10) and the blank (4) when said central portion is positioned in the recess in the bottom of the blank.

14 Claims, 4 Drawing Sheets

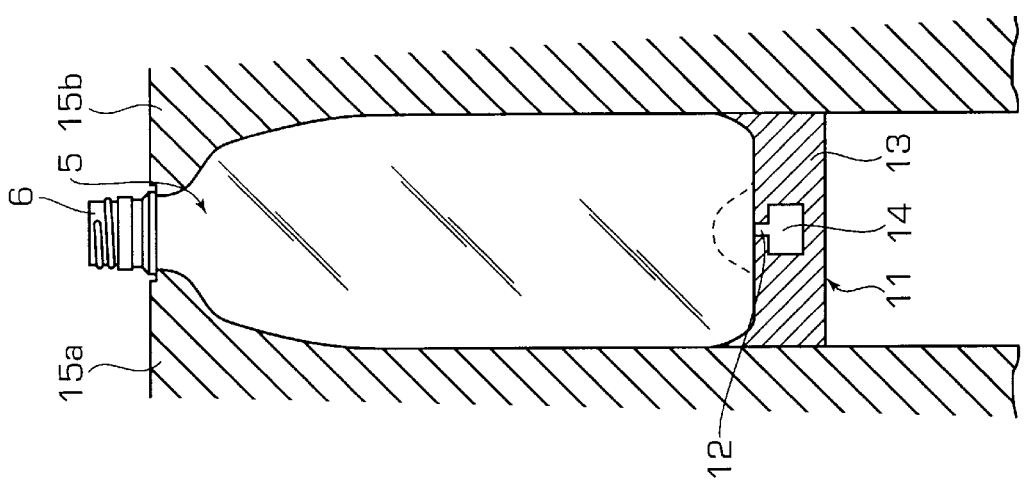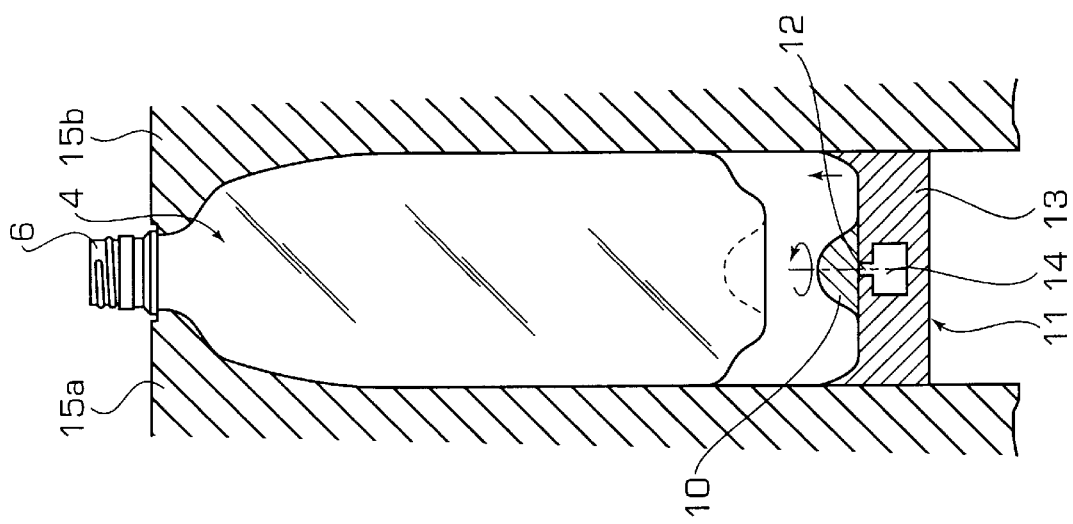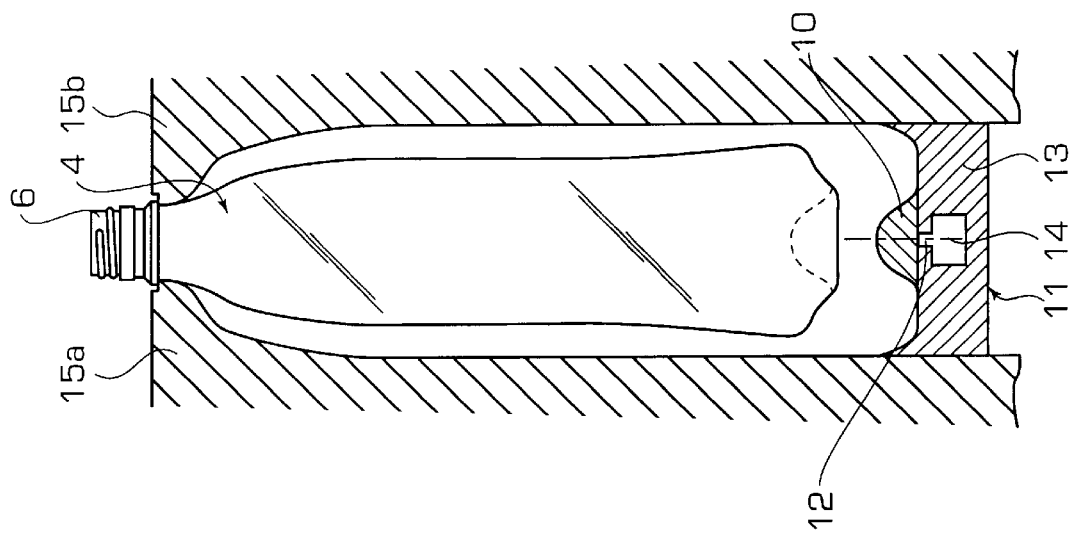

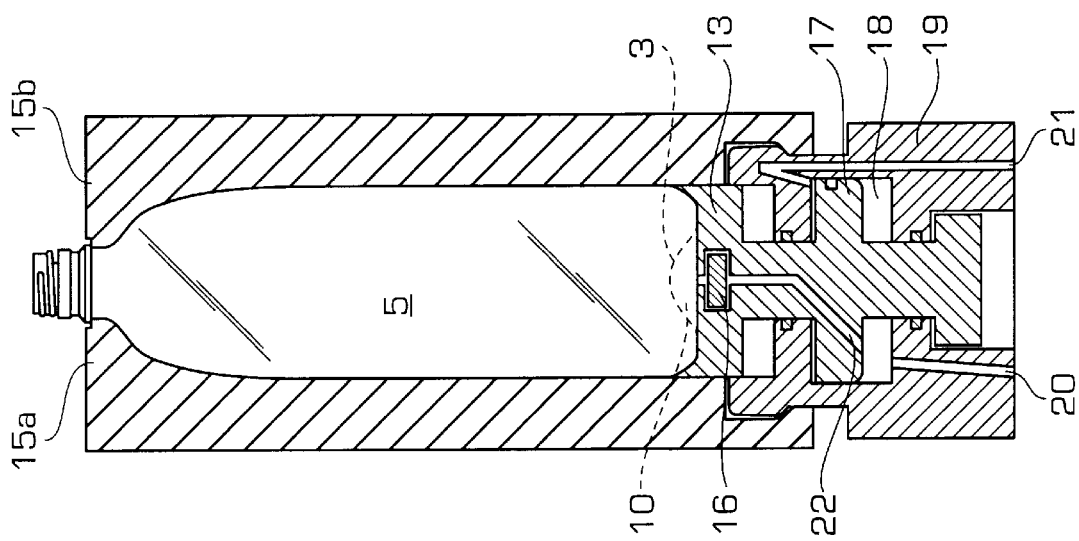
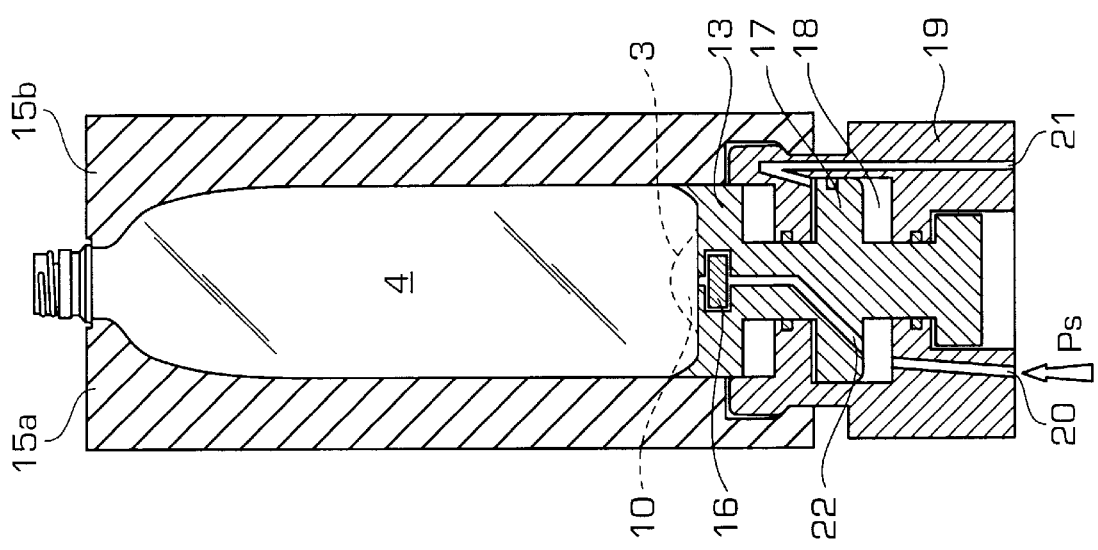
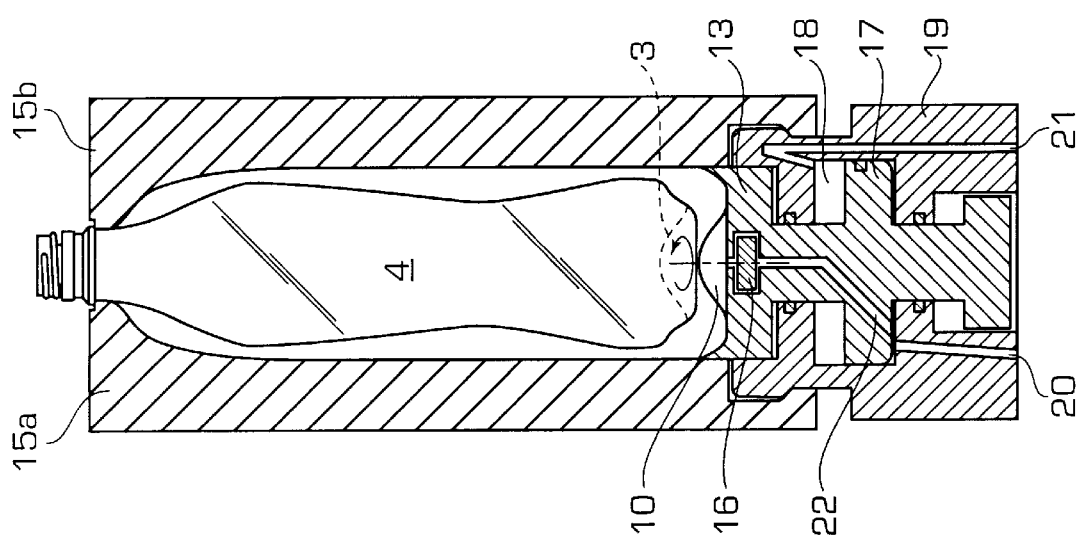

METHOD AND APPARATUS FOR MAKING CONTAINERS FROM THERMOPLASTIC MATERIALS

This invention is about refinements added to the process of setup and manufacturing of thermoplastic containers, such as bottles, that have a curved central section in the bottom, from rough shapes that too have a curved central section in the bottom with an inward convexity, the process containing at least a heating period of at least the body of the rough shape to bring the thermoplastic material to its softening temperature, a step during which the rough shape is positioned in a finishing mold designed to achieve the finished container, this finishing mold notably possessing a curved central section mold bottom whose dimensions allow it to be inserted in the hollow at the bottom of the rough shape, and a finishing step of blowing of the rough shape during which the curved central section of the mold is inserted into the hollow central section of the bottom of the rough shape.

BACKGROUND OF THE INVENTION

Processes and setups to obtain containers from rough shapes are now well-known. These allow the user to obtain containers that are able to sustain high temperatures and relatively severe mechanical pressure without losing their shape during use. In such processes, the molding is performed by blowing or by stretch-blowing, from a pre-form made of thermoplastic material whose body is brought to a temperature at least equal to the softening temperature of the material, and this results in an intermediary container of larger size than the finished container yet to be obtained; this intermediary container is then heated to obtain a rough shape of heated, shrunk body, which is then molded to form the final container.

Such processes and installation are, for example, known as European patent EP 442 836 in the name of the applicant.

Despite the fact that this process was vastly superior to previous techniques, it became obvious that the containers obtained by this process had a tendency to lose their shape when filled with hot liquids, and this made the container unstable. Then, the bottom structure itself was reworked, and it was found that the containers that had a curved bottom with an inward convexity, in other words containers with a "champagne bottom" because of the shape of the bottom which resembles that of a champagne bottle, could resist satisfactorily to these conditions.

The various processes and setups were tested and resulted in this type of final container bottom shape. It was determined that the containers that possess the best thermal or mechanical properties during use are those obtained from a rough shape possessing at least a curved primer of inward convexity in the central area, at the bottom on the final container. It was even noted that in certain applications that the rough shape must have a bottom whose shape and measurement must correspond to those of the bottom of the final recipient.

Therefore, the French patent request No 95 01507 presents a process and a setup that obtains a particular champagne-bottomed container from a rough shape whose bottom possesses the shape and size of the bottom of the final container.

Contrarily to the intermediary container and to the final container that are both obtained in a mold, the rough shape is obtained in air, after highly heating the body of the container and thus having provoked a relaxing of the constraints conferred to the thermoplastic material during the transformation of the pre-shape into the intermediary container. The result is that the rough shape resembles a container whose body is vaguely deformed or bloated, but that nevertheless possesses a bottom zone with a shape and dimension predetermined by the process used, that is to say either the final shape of the bottom of the final container, or a primer of the central part of the final container.

But, because of the relative indetermination of the shape of the body of the rough shape, it happens relatively often that the symmetry axis of the bottom zone is offset and/or tilted in relation to the axis of the finishing mold at the moment when the rough shape is placed inside of it. Actually, the positioning of the rough shape in the finishing mold is performed in the known manner with the neck, which is the only part that undergoes no deformation during the different steps of the transformation from a pre-shape to the final container.

The result is that sometimes the bottom area of the rough shape is not correctly centered at the moment of contact with the curved shape of the bottom of the mold, which often causes the bottom of the rough shape to get stuck on the curved shape of the bottom mold in an offset and/or tilted position, causing the final container to be misshapen and unsatisfactory.

SUMMARY OF THE INVENTION

The invention's goal is to remedy this inconvenience, proposing a process and setup allowing the user to obtain a correct centering of the central curved zone of the rough shape in relation to the curved area of the mold bottom.

The goals of the invention are attained by setting up a process such as described in the introduction that is characterized in that, to facilitate the centering of the bottom of the rough shape in relation to the curved central part of the mold bottom, a relative rotation movement between the curved area of the mold bottom and the central part of the rough shape central is performed from the moment that the rough shape is placed into the mold to the moment where the shapes are correctly positioned in relation one to another.

In fact, the relative rotation movement between the bottom of the rough shape and the bottom of the mold increases the sliding of the material on the central section of the bottom of the mold, thus allowing a correct centering.

Preferably, and according to another characteristic, the relative rotation movement is performed by rotating at least the central curved part of the bottom of the mold. Alternatively, even though this is more difficult to achieve, the relative rotation movement is achieved by turning the rough shape within the mold.

The invention also has for a goal a setup for the implementation of the process, characterized in that it can trigger the relative rotation of the rough shape and of the mold bottom.

In a preferred implementation, the means to trigger the relative rotation between the rough shape and the central section of the mold bottom are made up of a pneumatic rotary motor that powers the central part. This solution is particularly advantageous because the container assembly lines already possess the pressurized fluid distribution system as much to blow the containers as to move sections of the assembly line. It is noted that the mold bottom can generally be moved along the axis of the mold, at least to facilitate the setting of the rough shape and to facilitate the de-molding of the container. In other cases, the mold bottoms are moved along the same axis during the finishing phase, as it is the case in the French patent application No 95 01507 that this applicant filed, in order to compensate for the slight shrinking that occurs at the beginning of the finishing blowing and allows contact between the bottom of the mold and the bottom of the rough shape. These movements of the bottom of the mold are achieved with pneumatic devices, and it is therefore relatively easy to selectively divert a part of the fluid that serves in the movement of the mold bottom to power the pneumatic rotary motor.

BRIEF DESCRIPTION OF THE DRAWINGS

Other characteristics and advantages of this invention will appear during the reading of the description that is to follow, in sight of the figures in the appendix, on which:

FIGS. 3a to 3c and 4a to 4c illustrate in a schematic fashion two variations of a setup for implementation of the invention's process.

DETAILED DESCRIPTION OF THE PREFERRED EMBODIMENTS

Figure 1:
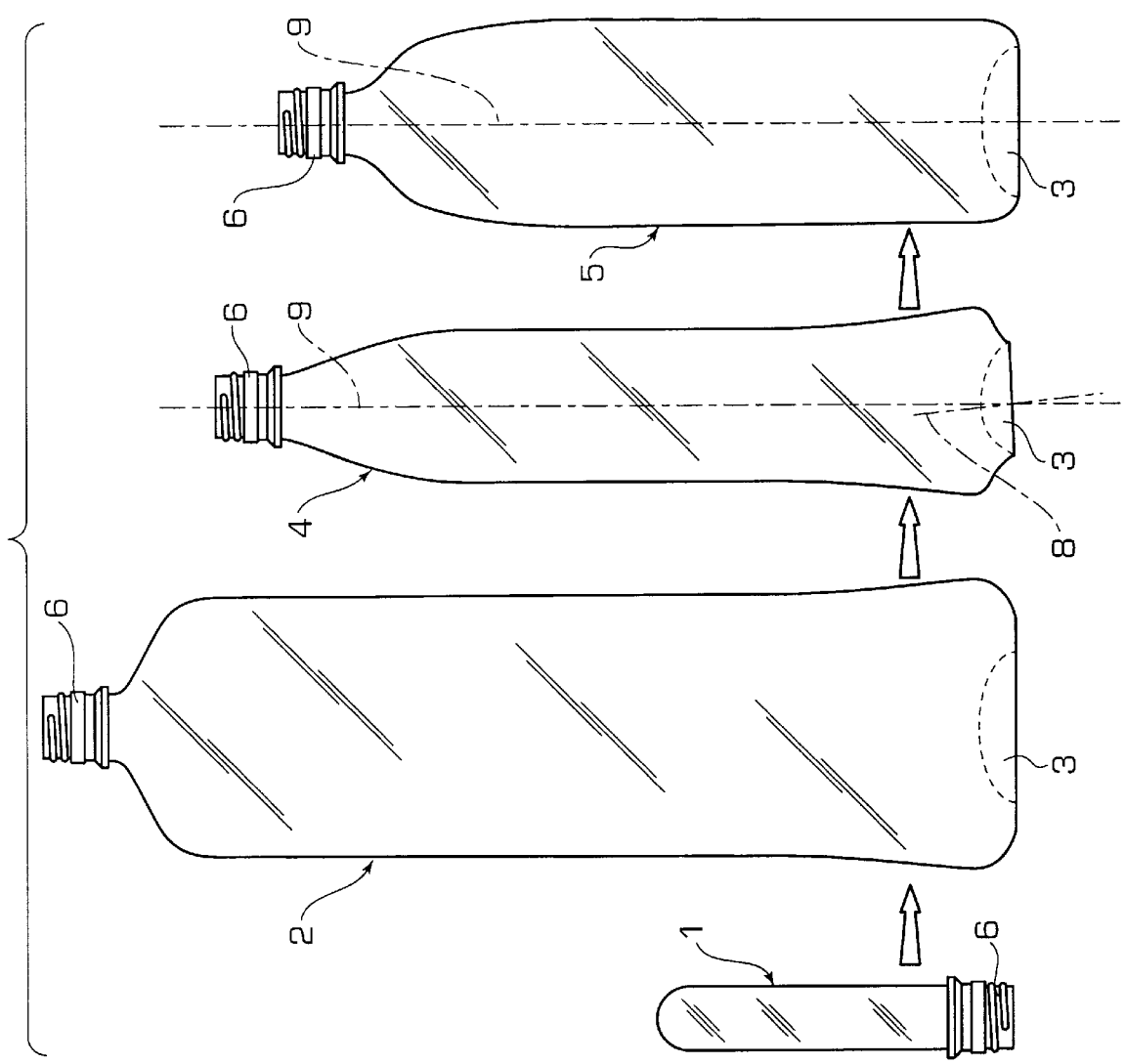
FIGS. 1 and 2 illustrate, each in a schematic fashion, different possible steps from a container manufacturing process that begins with a pre-shape that is transformed into an intermediary container, which is then thermally treated to obtain a rough shape before blowing the final container.
Figure 2:
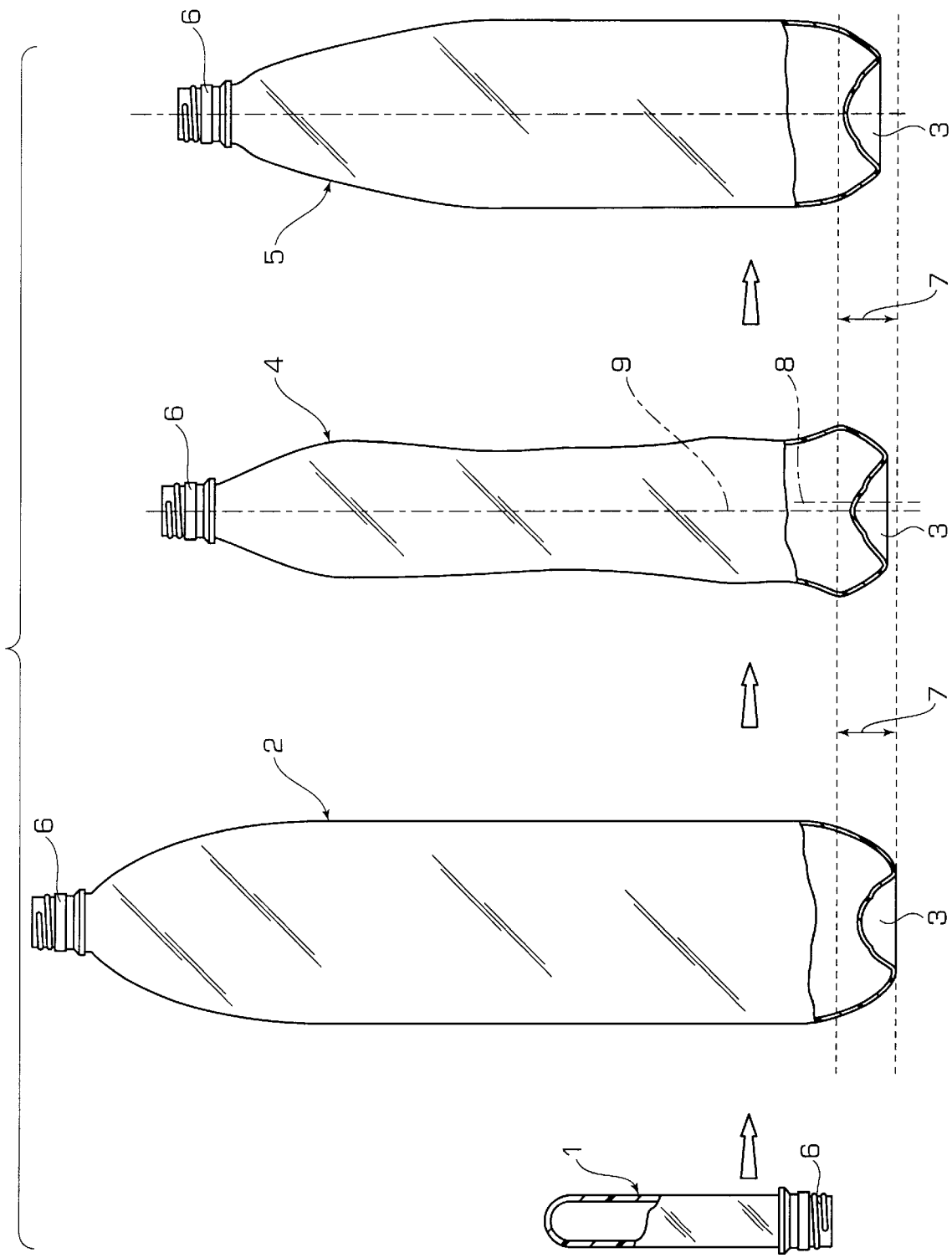

FIGS. 1 and 2 illustrate the known steps of the manufacture of a container possessing a hollow bottom going through a finishing step that consists of blowing a rough shape.

An initial pre-shape 1 is placed, after having been submitted to an appropriate heating to soften the thermoplastic material that it is made of, in a first mold (not shown) in which it is blown or stretched then blown, to obtain an intermediary container 2 possessing a bottom with a hollow area 3, with a convexity turned toward the inside of container 2.

The intermediary container 2 is then submitted to a heating that allows a freeing of the stresses induced during blowing (or of the stretching-blowing), which leads to a hot rough shape 4 with a longitudinally and transversally shrunken body in relation to the intermediary container.

The preceding steps are examples carried out under general conditions as indicated in the European document EP 0 442 936 mentioned in the introduction. But other methods that the professional in this field will know can be used and/or combined and/or adapted to obtain the desired result.

The rough shape 4 is then submitted to an appropriate thermal treatment to allow it to be treated in the finishing mold (not shown), to obtain the final container 5.

Preferably, and in a known manner, the neck 6 of the final container is the same, in shape and in size, as that of the pre-form. It is not submitted to dimensional modifications during the diverse transformation steps.

It is important to remind that a particular thermal treatment can be applied to the rough shape 4 and to its neck 6 to noticeably increase the crystallinity rate of the final container 5 in relation to that which can be obtained by a classical blowing process.

This way, the invention is particularly adapted to the manufacturing of containers capable of withstanding severe thermal or mechanical stresses during use.

The difference between FIGS. 1 and 2 comes from the fact that in the case of FIG. 1, the bottom of the rough shape is slightly different than that of the final container 5. In fact, the process which steps are illustrated by FIG. 2, known as French patent application 95 01507, consists, among others, of making the intermediary container 2 such as its bottom section 7 will not undergo any more modification during the following steps of shaping of the rough shape 4 and of the finishing blowing.

However, in a known way as well, the process illustrated in FIG. 1 supposes that the thermal treatment applied to the rough shape allows a modification of the bottom during the final blowing, to bring it to its final shape.

As mentioned, the phase of releasing the constraints that yields the rough shape 4, from the intermediary container 2, often yields a rough shape 4 whose bottom hollow section 3 symmetry axis 8 is axially offset and/or tilted in relation to the neck's symmetry axis 9 which corresponds to the symmetry axis of the whole of the final container 5.

As indicated, the mold used during the finishing phase has a curved section in the bottom that is designed to be inserted into the hollow section 3 of the bottom of the rough shape, in order to avoid an uncontrolled deformation of this hollow section. To this effect, the bottom of the mold is axially mobile and is brought in contact with the bottom of the rough shape during the finishing phase. According to the complexity of the finishing process, the bottom of the mold can be brought in contact with the bottom of the rough shape immediately upon closure of the mold, or even, as described in the French patent application published under number 2 714 631 in the name of the applicant, the bottom of the mold can be brought in contact with the bottom of the rough shape during the finishing blowing.

If, as illustrated in FIGS. 1 and 2, the axes 8—from the bottom of the rough shape 4—and 9—passing through the neck—are offset, then a poor positioning of the curved section in the hollow 3 sometimes occurs, and a deformed bottle is obtained.

According to the invention, and as described in FIGS. 3A to 3C and 4A to 4C, a relative rotation between the rough shape 4 and the curved central section 10 of the bottom of the mold 11 is performed.

A first solution, not shown in the drawings, and relatively difficult to achieve, consists of rotating the rough shape relative to the mold. This solution is applicable only if the bottom of the mold in brought into contact with the bottom of the rough shape at the moment the mold is closed. Because after the closure, once the finishing blowing has begun, there is a bloating of the shoulders and of the body of the rough shape that bring the sides of the rough shape in contact with the walls of the mold's cavity. Therefore, if the rough shape rotation solution is used, it is imperative to stop the rotation of the rough shape before the shoulder or the body of the rough shape make contact with the wall of the mold, or the final container will be of poor quality.

Besides, other technological requirements make the other solution more attractive to this one. The other solution, as illustrated in FIGS. 3A to 3C and 4A to 4C, consists of designing the bottom of the mold in order to be able to rotate the central curved section 10 of the bottom 11.

In the actual process, illustrated in FIGS. 3A to 3C and 4A to 4C, the bottom of the mold 11, axially mobile in the direction of the finishing mold's axis, is made of at least two parts: the central curved part 10 designed to be rotated around the axis 12 of the bottom, the same as the axis of the mold and of the desired container, and a peripheral section 13 that holds the central rotating part 10.

Preferably, the peripheral section only moves axially.

In FIGS. 3A to 3C, the rotation of the curved central section is achieved with the aid of a motor 14, such as an electrical motor, attached to the block that is the peripheral section of the bottom 11 of the mold. The mold also contains, in the known manner, in addition to the bottom 11 of the mold, two half-molds 15A and 15B that determinate the shape and the final size of the body and of the shoulder of the final container 5.

FIGS. 4A to 4C illustrate a preferred implementation process of the invention. This implementation uses, for the rotation of the central curved part 10 an pneumatic motor 16. The structure of such motor is known from diverse applications and will not be detailed in these figures. Such a motor contains a rotary turbine powered by a fluid, such as compressed air, and the rotational motion of the turbine is transmitted to the central part 10 by the means of gears or equivalent means that can be easily implemented by professionals in this field.

It is advantageous to have the pressurized fluid used for the rotation of the pneumatic motor 16 to be for example the compressed air that is used to move a piston 17 which is attached to the bottom of the mold 11 to effect the longitudinal movement of the mold 11 and to bring it into contact with the bottom of the rough shape 4.

Actually, the bottom of the mold 11 is, in the known manner, attached to the piston 17, which is mobile within a chamber 18 located in a base 19. This base 19 is itself mobile, along the longitudinal axis of the molding cavity between a high and a low position. In the high position, the base 19 is fitted within the lower section of the half-molds 15A and 15B, and completes the molding cavity. The low position allows the de-molding of the container.

When the base is in the high position, such as on FIGS. 4A and 4C, it is possible to move the piston 17 by using a compressed fluid, such as compressed air, that circulates in the device for the blowing of the containers.

The pressure jack thus created by the piston and the chamber has two purposes, and two ducts 20 and 21 go through the base to end up on either side of the chamber 18 and of the piston 17.

The first duct 20 allows the bringing of the bottom of the mold 11 in contact with the bottom of the rough shape; the second duct 21 allows the spreading of the bottom of the mold, when lowering it.

To allow the rotation of the pneumatic motor 16 by the fluid bringing the bottom 11 of the molding in contact with the bottom of the rough shape 4 during the finishing, the bottom 11 of the mold is pierced by a duct 22 that opens up against the turbine on one end and that is linked with the chamber 18 on the side where the duct 20 opens up to bring the fluid enabling the displacement of the pressure jack 17 in the direction of the joining of the bottom of the mold and of the bottom of the rough shape.

Thus, when the pressure jack is activated to bring together the bottom of the mold and the bottom of the rough shape, the pneumatic motor is automatically activated.

The variation in FIGS. 3A to 3C can utilize, for the longitudinal displacement of the bottom of mold, a structure similar to that of FIGS. 4A to 4C. The only difference is that duct 22 is not necessary, since the motor is electric rather than pneumatically powered.

On FIGS. 3A and 3C is also shown the case when the bottom of the mold 11 is not brought in contact with the bottom of the rough shape 4 at the closure of the mold, but rather progressively brought in contact during the finishing blowing.

Actually, it occurs that during the finishing step, and this has been described and explained in the already mentioned French patent application 2 714 631, that the rough shape is submitted to a height reduction, because of the bloating of the shoulder and of the body which, when making contact with the walls of the mold cavity 15A and 15B, cause the bottom to rise, by suction.

In order to avoid over-stretching the sides, the bottom of the mold is raised.

Thus, FIG. 3A shows the phase immediately following the closing of the finishing mold: the rough shape 4 is at maximum length, and the bottom of the mold in its low position.

FIG. 3B shows, in an exaggerated manner, the shape of the rough shape after the beginning of the blowing.

The rough shape has retracted, and its bottom has lifted itself up. The bottom 11 of the mold is being raised, with its central curved section rotating.

FIG. 3C shows the finished container and the position occupied by the bottom of the mold at the end of this phase.

In FIGS. 4A to 4C is shown the case when the bottom of the mold 11 is brought into contact with the bottom of the rough shape 4 immediately after the closing of the mold.

In FIG. 4A, the bottom 11 of the mold has not yet begun its rise, but the central part 10 is already rotating. To perform this, a pressurized fluid Ps is injected in duct 20. The raising then begins and the bottom 11 of the mold reaches the position shown on FIG. 4B.

Also, FIGS. 4A to 4C illustrate the case when the shape of the bottom of the rough shape does not correspond exactly to that of the bottom of the finished container 5, and FIG. 4B shows the said container in its near-final shape with the exception of the bottom which is not then completely shaped. FIG. 4C finally shows the finished container 5 and the positions occupied by the container 5, and by the different elements (walls 15A, 15B, and bottom 11) of the mold.

The rotation of the curved central section 10 of the bottom of the mold allows a correct centering of the bottom and thus a satisfactory finished container 5.

It is of course understood that the invention is not limited at all to the described implementations, and rather covers all the variations.

What is claimed is:

1. A process of manufacturing a container of thermoplastic material with a bottom which has a curved central section with an inward convexity, from a rough shape having a body, said rough shape having a bottom including a curved central section with an inward convexity with a hollow central section, the process of manufacturing a finished container comprising the steps of:

heating the body of the rough shape in order to bring the thermoplastic material to a softening temperature;

positioning the rough shape inside of a finishing mold designed to obtain the finished container, said mold containing at least a bottom with a curved central section whose shape and size allow said curved central section to be inserted into the hollow central section of the bottom of the rough shape, and finishing said container by blowing of the rough shape, during which the curved central section of said mold is inserted in the hollow central section of the bottom of the rough shape, wherein in order to facilitate a centering of the bottom of the rough shape in relation to the curved central section of the bottom of the mold at the moment of contact between them, a relative movement of rotation between at least the curved central section of the mold and the hollow central section of the bottom of the rough shape is performed between a moment when the rough shape is inserted into the mold and a moment when said curved central section of the mold and said hollow central section of the rough shape are in an aligned position in relation to one another; and wherein the relative rotation is performed by rotating the curved central section of the bottom of the mold in relation to other parts of the mold.

2. The process according to claim 1, wherein a shape and dimensions of the hollow central section of the bottom of the rough shape correspond to a shape and dimensions of a bottom of the finished container, and said bottom is not modified during the finishing step.

3. The process according to claim 2, wherein the bottom of the rough shape is not heated to the softening temperature of the material during the rough shape heating step.

4. The process according to claim 1, wherein the bottom of the rough shape is a primer of the bottom of the finished container, and the bottom of the rough shape is heated during the rough shape heating step so that the material is heated to the softening temperature, and the bottom of the rough shape is modified during the finishing step in order to obtain the bottom of the finished container.

5. The process according to claim 1, wherein the shape and the dimensions of the curved central section of the mold approximate those, respectively, of the curved central section of the bottom of the finished container.

6. The process according to claim 1, wherein during the finishing step, the bottom of the mold is axially moved to be positioned in relation to the bottom of the rough shape, and that the relative rotation between the curved central section of the mold and of hollow central section of the rough shape is performed during this movement.

7. The process according to claim 1, wherein during the blowing during the finishing step, a modification of a length of the rough shape is effected, during which the bottom of the mold is brought closer to the bottom of the rough shape, to come into contact with said rough shape, and the relative rotation between the curved central section of the mold and of hollow central section of the rough shape is performed during this modification.

8. An apparatus for implementation of the process according to claim 1, wherein said apparatus comprises a finishing mold containing at least a bottom with a curved central section, and means to implement a relative rotation between the curved central section of the bottom of the mold and the bottom of the rough shape.

9. The apparatus according to claim 8, wherein the means implements the rotation of the curved central section of the bottom of the mold.

10. The apparatus according to claim 9, wherein the means implementing the rotation of the central curved section of the bottom of the mold comprises a motor attached to said mold.

11. The apparatus according to claim 10, wherein the motor is an electric motor.

12. The apparatus according to claim 10, wherein the motor is a pneumatic motor powered by a fluid (Ps) available to machinery.

13. The apparatus according to claim 12, wherein the fluid is used in the blowing of the finished container during the finishing step, and said apparatus possesses the means, such as a deviation, to channel a part of the blowage fluid toward the motor.

14. The apparatus according to claim 12, wherein the bottom of the mold is axially movable by pneumatic means during a closing of the mold and/or during a finishing stretching, and the motor is powered by a portion of the fluid used in displacement of the bottom of the mold.

* * * * *